US008634342B2

(12) United States Patent
Rahman

(10) Patent No.: US 8,634,342 B2
(45) Date of Patent: Jan. 21, 2014

(54) UPGRADING MESH ACCESS POINTS IN A WIRELESS MESH NETWORK

(75) Inventor: Shahriar I. Rahman, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 1713 days.

(21) Appl. No.: 11/539,137

(22) Filed: Oct. 5, 2006

(65) Prior Publication Data

US 2008/0084855 A1 Apr. 10, 2008

(51) Int. Cl.
*H04W 4/00* (2009.01)
*H04W 40/00* (2009.01)
*H04B 7/00* (2006.01)

(52) U.S. Cl.
USPC ........... 370/328; 370/310; 455/41.2; 455/449

(58) Field of Classification Search
USPC .......... 370/310, 328, 329; 455/41.2, 446, 449
See application file for complete search history.

(56) References Cited

U.S. PATENT DOCUMENTS

| 6,319,125 | B1 * | 11/2001 | Acres | 463/25 |
| 6,628,933 | B1 * | 9/2003 | Humes | 455/404.1 |
| 6,795,415 | B1 * | 9/2004 | Suonvieri | 370/333 |
| 6,813,608 | B1 * | 11/2004 | Baranowski | 705/6 |
| 7,362,709 | B1 * | 4/2008 | Hui et al. | 370/237 |
| 2002/0115442 | A1 * | 8/2002 | Dorenbosch | 455/446 |
| 2003/0145092 | A1 * | 7/2003 | Funato et al. | 709/229 |
| 2003/0212821 | A1 * | 11/2003 | Gillies et al. | 709/238 |
| 2004/0090943 | A1 * | 5/2004 | da Costa et al. | 370/338 |
| 2005/0083949 | A1 * | 4/2005 | Dobbins et al. | 370/395.53 |
| 2005/0250528 | A1 * | 11/2005 | Song et al. | 455/522 |
| 2006/0095340 | A1 * | 5/2006 | Iadanza et al. | 705/26 |
| 2006/0095903 | A1 * | 5/2006 | Cheam et al. | 717/168 |
| 2006/0109815 | A1 | 5/2006 | Ozer et al. | 370/329 |
| 2006/0126576 | A1 * | 6/2006 | Dale et al. | 370/336 |

FOREIGN PATENT DOCUMENTS

WO WO 2007132473 A1 * 11/2007

OTHER PUBLICATIONS

Castagnoli, Neal, "How AWPP will make mesh networks easier to deploy" Part 2, in Wireless Net Design Line, Dec. 5, 2005, CMP Media LLC, downloadable (Sep. 28, 2006( as www.wirelessnetdesignline.com/howto/174900407.*

"How AWPP will make mesh networks easier to deploy," Part 1, by Neal Castagnoli, in Wireless Net Design Line, Dec. 5, 2005, CMP Media LLC, 600 Community Drive, Manhasset, NY 11030, downloadable (Sep. 28, 2006) as www.wirelessnetdesignline.com/howto/174900638 at www.wirelessnetdesignline.com.

(Continued)

Primary Examiner — George Eng
Assistant Examiner — Jing Gao

(57) ABSTRACT

A method, system, and logic for upgrading mesh points of a wireless mesh network. One method includes maintaining a mesh topology data structure containing information on the tree topology of a wireless mesh network. The method further includes using a tree-walking method to send an upgrade message to the root access point and to each other mesh point in the wireless mesh network until each mesh point has received the upgrade message. Receiving the upgrade message enables the receiving mesh point to upgrade according to the contents of the upgrade message without necessarily disrupting the mesh network.

18 Claims, 7 Drawing Sheets

(56) References Cited

OTHER PUBLICATIONS

"How AWPP will make mesh networks easier to deploy," Part 2, by Neal Castagnoli, in Wireless Net Design Line, Dec. 5, 2005, CMP Media LLC, 600 Community Drive, Manhasset, NY 11030, downloadable (Sep. 28, 2006) as www.wirelessnetdesignline.com/howto/174900407 at www.wirelessnetdesignline.com.

Control and Provisioning of Wireless Access Points (CAPWAP) Protocol Specification. www.capwap.org. Version 01, dated May 2006, downloaded (Sep. 28, 2006) at capwap.org/draft-ietf-capwap-protocol-specification-01.txt.

IEEE Std. 802.11h-2003, also ISO/IEC 8802-11:2005/Amd 5:2006 (Amendment to ISO/IEC 8802-11:2005), available from IEEE, New York, NY. Also at www.IEEE.org.

Search Report for related PCT Application No. PCT/US2007/078315, mailed Mar. 17, 2008.

PCT Preliminary Report on Patentability for PCT Application No. PCT/US2007/078315 mailed on Apr. 16, 2009.

\* cited by examiner (DTSL security state diagram not shown)

UPGRADING MESH ACCESS POINTS IN A WIRELESS MESH NETWORK

TECHNICAL FIELD OF THE INVENTION

The present disclosure relates generally to wireless networks.

BACKGROUND

In a typical controller-based wireless local area network (WLAN), all access points (APs) are connected to the WLAN Controller (the WLAN manager) by wire. It is therefore relatively straightforward to upgrade software for the APs or to upgrade the configuration of APs. For example, with wireless access points that are lightweight access points whose AP functionality is controlled by a controller, all lightweight access point software images are embedded in the Controller image. When a controller image is upgraded, each time an AP joins that controller, a version check is carried out, and if needed, the controller upgrades the access point.

In a wireless mesh network, on the other hand, the mesh points that are access points, called mesh access points (mesh APs) are typically wirelessly connected in a hierarchical tree topology, that is, there is a parent-child relationship between almost all of the mesh APs up to the root of the tree topology, which is the mesh AP called a root AP or root mesh AP. Such a root AP typically includes a wired link to a wired network. Any software upgrade or any configuration change such as a change in data-rate, change of channel, change of power, change of range and so forth, flows in a multi-step top-down manner outward from the root AP, making several parent-child hops, even though to the WLAN manager, the change request(s) appear as if they occur in parallel. As a result, when a particular mesh AP is being upgraded or configured, there is in effect an outage of the segment of the mesh network below the particular mesh AP being upgraded in the tree topology. This is of course undesirable. Such upgrades may cause chaotic network outages lasting an unpredictable period of time, typically between several minutes and several hours.

SUMMARY

One embodiment of the invention includes a method comprising accepting new software for a controller of a wireless mesh network. The mesh network includes a root access point and other mesh points, including one or more mesh access points. The root access point and the mesh points are coupled by a wireless backhaul network, with the root access point coupled to an active controller that controls the root access point and mesh access points, also to a standby controller capable of controlling the root access point and mesh access points. The method includes updating one of the controllers with the accepted software while the other controller controls the root access point and mesh access points, and switching the root access points and the mesh access points of the mesh network to the updated standby controller without interrupting operation of the mesh network, and updating the non-updated controller with the accepted software.

One embodiment of the invention includes a method comprising maintaining a mesh topology data structure containing information on the tree topology of a wireless mesh network. The method further includes using a tree-walking method to send an upgrade message to the root access point and to each other mesh point in the wireless mesh network until each mesh point has received the upgrade message. Receiving the upgrade message enables the receiving mesh point to upgrade according to the contents of the upgrade message without necessarily disrupting the mesh network.

In one version, the upgrade message is for an upgrade wherein none of the receiving mesh points need to be rebooted. The method for such an upgrade further comprises receiving an upgrade acknowledgement message from each mesh point that receives the upgrade message and upgrades as a result of the receipt.

In one version, the upgrade message is for an upgrade wherein the receiving mesh points need to be rebooted, e.g., a software upgrade, and wherein the using of the tree-walking method to send the upgrade continues until all mesh points of the tree topology receive the upgrade message. The method includes sending a message to the mesh points to reboot once all mesh points of the tree-topology have received the upgrade message(s).

In one version, the upgrade message includes a configuration upgrade message comprising one or more new configuration parameters for the mesh point.

One embodiment of the invention includes a system comprising a controller, and a mesh network comprising a root access point coupled to the controller; and one or more other mesh points, including at least one mesh access point wirelessly coupled via a wireless mesh network to the root access point, the root access point and other mesh points forming a tree topology of mesh points in which the root access point is the root of the tree topology. The controller is operative to control operation of the wireless mesh network. The controller is further operative to send a configuration upgrade message to the root access point, the configuration upgrade message comprising one or more configuration parameters for the mesh points of the mesh network.

The root access point is operative to respond to receiving the configuration upgrade message, including upgrading according to the configuration parameters, sending an acknowledgement message to the controller, sending one or more action messages containing the one or more configuration parameters to each of its directly connected mesh points, waiting for acknowledgements from other mesh points of the mesh network, and sending an acknowledgement message to the controller corresponding to the received acknowledgements.

Each other mesh point is operative to respond to receiving the action messages, including upgrading according to the configuration parameters, sending an acknowledgement to its immediate parent in the tree topology, and in the case that there are directly connected child mesh points, sending the one or more action messages to each of its directly connected child mesh points, waiting for acknowledgements from its child mesh points of the mesh network, and sending an acknowledgement to its controller corresponding to the received acknowledgements. The upgrading according to the configuration parameters occurs without necessarily disrupting the mesh network.

Other respective embodiments include logic encoded in one or more tangible media for execution, and when executed operable to carry out respective methods described herein.

Presented herein is a solution to the upgrade problem—likely the simplest solution. The proposed method includes simple extensions of LWAPP state machine for WLAN mesh networks. The WLAN controller (the WLAN manager) used in this embodiment is described as a Mesh Controller.

Described herein is a simple method and protocol which deterministically reduces the downtime and limits the network outage caused by various types of upgrades in a centrally controlled WLAN mesh network. This method and protocol is fully compatible with Cisco's LWAPP WLAN control protocol.

Embodiments of the methods described herein call for a simple extension of existing, tried-and-true LWAPP protocol, thereby, fully compatible with any WLAN mesh network that incorporates a controller.

Particular embodiments may provide all, some, or none of these aspects, features, or advantages. Particular embodiments may provide one or more other aspects, features, or advantages, one or more of which may be readily apparent to a person skilled in the art from the figures, descriptions, and claims herein.

DESCRIPTION OF EXAMPLE EMBODIMENTS

Described herein is a method and system operative to carry out a software upgrade or configuration upgrade for mesh points in a centrally managed wireless mesh network.

Figure 1:
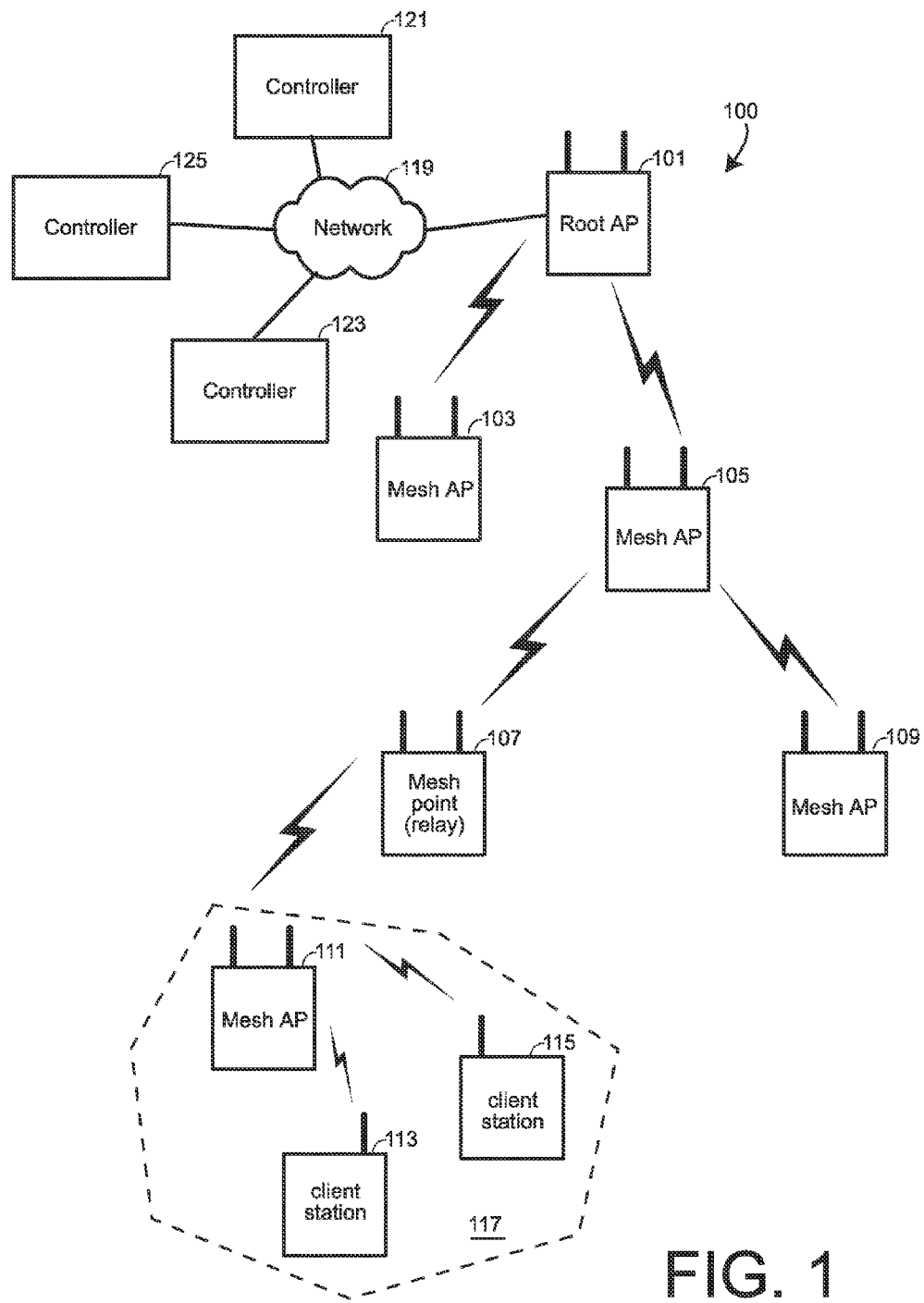
FIG. 1 shows a simplified representation of an example wireless mesh network.

FIG. 1 shows a simple example wireless mesh network 100 that includes a plurality of mesh points wirelessly coupled by a backhaul wireless network of links between the mesh points, each mesh point-to mesh point direct wireless link called a hop. The links of the backhaul network form a hierarchical tree-topology with one mesh point being the root of the tree. The backhaul network is operative to transport data between any mesh point and the root mesh point.

In FIG. 1, some of the mesh points are also each a wireless access point (AP), and called a mesh access point (mesh AP). In the remainder of the description, without loss of generality, each mesh point will be considered a mesh AP. Those mesh points that in the network are not also an access point are then functionality the same as a mesh AP with no clients and which does not advertise AP capabilities. In one embodiment, one mesh AP is the root mesh point, and is called the root access point (root AP). Thus, shown in the example mesh network 100 is a root AP 101 with a direct backhaul link to mesh AP 103 and to mesh AP 105. The mesh AP 105 has a direct backhaul link to a mesh point 107 that acts as a relay, to a mesh AP 109. The relay mesh point 107 has a direct backhaul link to mesh AP 111, and, as described above, can be considered mesh AP 107. Each mesh AP has a backhaul radio interface and an access radio interface, and can form an infrastructure wireless network via its access radio interface. FIG. 1 shows mesh AP 111 with its infrastructure wireless network 117, including a client station 113 and a client station 115.

The root AP 101 has wired connection to a network 119.

At least one controller 121 is operative to control operation of the mesh network, including, for example, maintaining the present tree topology of the mesh network. In one embodiment, such a mesh controller 121 is coupled to the mesh network via the network 119.

In one embodiment of the network 100, the mesh APs are what are known as lightweight access points whose AP functionality is controlled by a controller. Three controllers 121, 123, and 125 are shown in FIG. 1 coupled to the network 119, and then to the mesh APs via the root AP 101 and the backhaul links to the respective AP. As stated above, one of the controllers 121 is operative to control the mesh network. Each such controller can be operative to control more than one function, so, in one example, the controller 121 is operative to control the mesh network, and further to control the AP functionality of one or more of the mesh APs. The controller 123 is a standby controller to provide backup to the controller 121, so it has the same functionality as the controller 121.

A protocol, called Lightweight Access Point Protocol (LWAPP) is used between each mesh AP and the controller of the respective mesh AP to control the AP functionality of the mesh AP. LWAPP would be known to those in the art. A version of LWAPP is being standardized (2006) as an IETF draft under the name of Control And Provisioning of Wireless Access Points (CAPWAP) Protocol. See www~dot~capwap~dot~org where ~dot~ denotes the period "." in the actual URL. The current version is dated May 2006, and document available (September 2006) at the URL: capwap~dot~org/draft-ietf-capwap-protocol-specification-01~dot~txt where ~dot~ denotes the period "." in the actual URL. This draft is referred to herein as the "CAPWAP draft specification." While the description herein refers to LWAPP messages and LWAPP frames, the reader will understand that the embodiments described herein in general conform to the CAPWAP draft specification and mesh extensions thereto, possibly with different names, unless the features are new and being added herein. Of course the invention is not restricted to this protocol, and other control protocols may be used.

In the example mesh network 100, LWAPP messages are sent between each mesh AP and its controller by forming a secure LWAPP tunnel between the mesh AP and its controller using the backhaul network.

Figure 2:
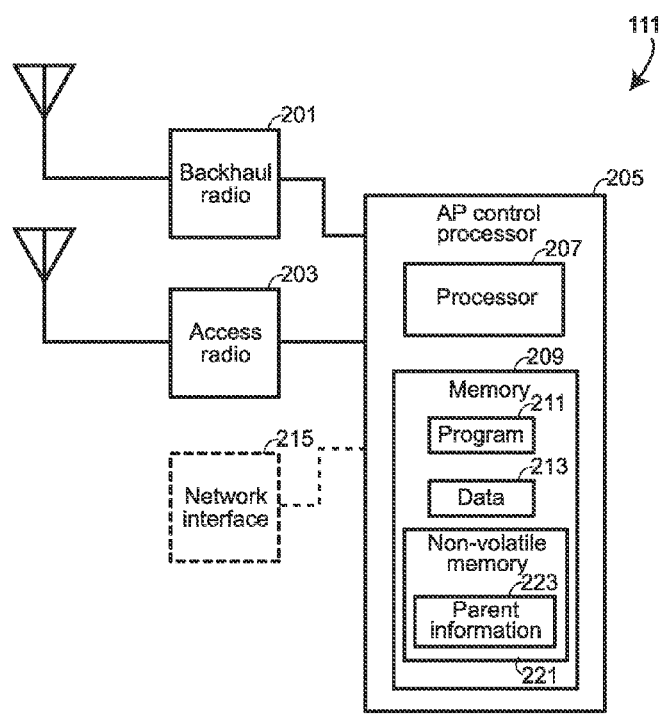
FIG. 2 shows an example mesh AP.

FIG. 2 shows an example mesh AP, say mesh AP 111 that includes a backhaul radio interface 201, an access radio interface 203, and an AP control processor 205 to which the backhaul and access radio interfaces are coupled. In one embodiment, the backhaul radio operates on a different frequency band than the access radio interface. In particular, the backhaul radio interface is operative to communicate according to the IEEE 802.11a standard in the approximately 5 GHz band, and the access radio interface is operative to communicate according to the IEEE 802.11b,g standard in the approximately 2.4 GHz band. Each radio interface includes a respective set of one or more antennas.

The AP control processor 205 includes a programmable processor 207 and a memory 209. One or more features of the present invention operate in a mesh AP, and are embodied in the form of software programs 211 in the memory. Furthermore, one or more configuration parameters are stored in the memory 209 as data 213.

Some versions of a mesh AP include a wired network interface 215 that enables the mesh AP to connect to a wired network, e.g., to operate as a root AP. Furthermore, each mesh AP can operate as a relay mesh point.

Figure 3:
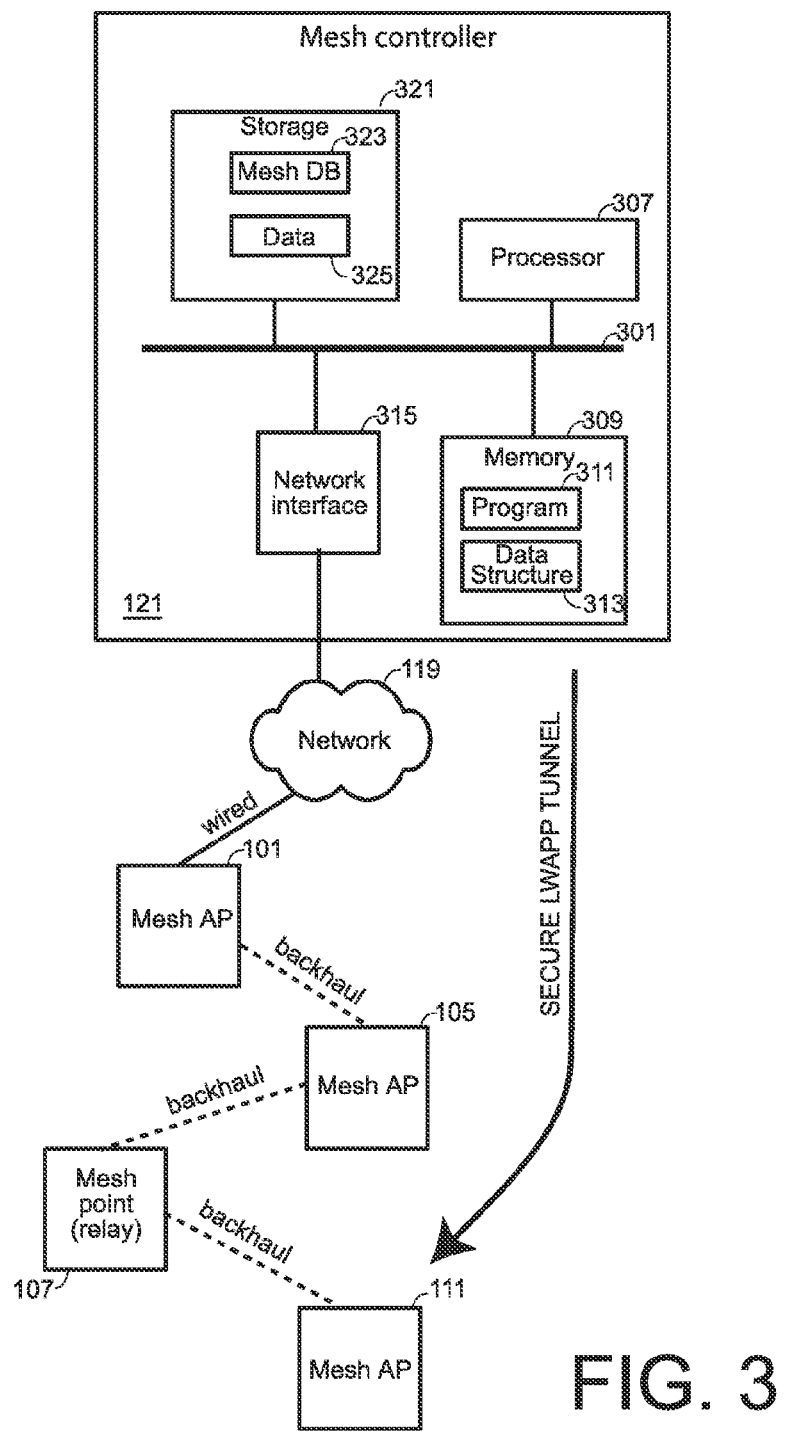
FIG. 3 shows part of the example mesh network with the example mesh controller shown in more detail than in FIG. 1.

FIG. 3 shows part of the mesh network with an example mesh controller 121 to control operation of the mesh network 100. FIG. 3 shows some of the elements of the controller 121. The mesh controller includes at least one programmable processor 307, a memory 309, a storage subsystem 321, and a network interface 315, all coupled via a bus structure 301, which, for simplicity, is shown as a simple bus. Some of the features of the present invention operate on the mesh controller 121, and include software shown as program 311 stored in memory 309. The mesh controller maintains a mesh data structure 313 that includes information on the tree topology, such a mesh data structure shown for simplicity in memory 309. The mesh data structure may use information stored in the storage subsystem 321, such information shown as a mesh database 323. Other data 325 is shown included in storage 321, and includes, for example, a software image for each mesh AP (or other mesh point).

Note that in one embodiment, the backup controller 123 also has the same architecture as shown in FIG. 3.

One embodiment of the present invention is a method of upgrading one or more of the mesh APs of a mesh network such as the example mesh network 100. Two types of upgrades are covered. One is a software upgrade for each mesh AP, meaning an upgrade of the operating software, delivered from the controller as a software image. Another type of upgrade is a configuration upgrade that involves one or more of a channel change, a power setting change, a data rate change, range change and/or any other configuration change that is potentially disruptive of the mesh network.

In addition to there being a software upgrade and a configuration upgrade, upgrades are distinguishable by whether any of the mesh APs (or other mesh points) require rebooting. By a hard upgrade is meant an upgrade of one or more mesh APs that requires a reboot of all or some of the mesh APs of the mesh network. By a soft upgrade is meant an upgrade not requiring a reboot of any mesh AP of the mesh network.

By a catastrophic upgrade is meant an upgrade that may break one or more backhaul links of the backhaul network. This may cause the mesh network to de-stabilize. Either soft or hard upgrades can be a catastrophic upgrade.

Controller Software Upgrade.

One embodiment of the invention is a method to upgrade software in a controller. A software upgrade is typically a hard upgrade because it requires a mesh AP to reboot—to restart—with the new software. In one embodiment, the mesh network includes two mesh controllers: A first mesh controller, shown as controller 121 in FIG. 1, and called the active mesh controller, responsible for controlling the active WLAN mesh network, and a second controller, shown as controller 123 in FIG. 1, and called a standby mesh controller, and responsible for providing redundancy to the active mesh controller. The architecture of FIG. 3 is not only applicable to the active controller 121, but also to the standby controller 123. Note that there may be other controllers present, and one such other controller 125 is also shown in FIG. 1.

Figure 4:
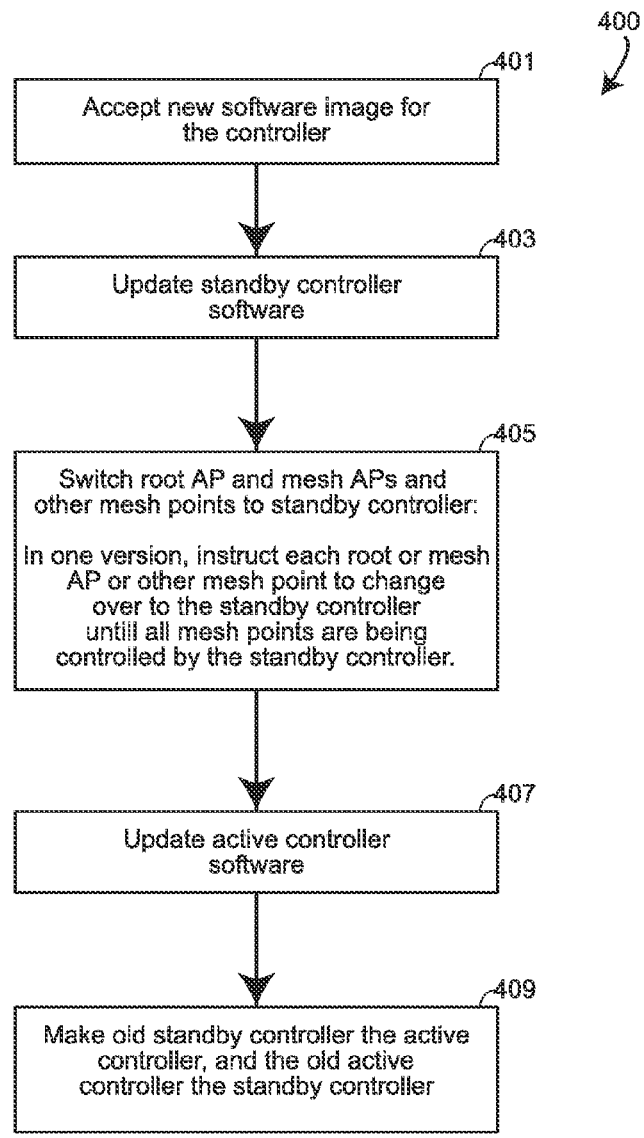
FIG. 4 shows one embodiment of a method of upgrading the software in the active controller.

FIG. 4 shows one embodiment of a method 400 of upgrading the software in the active controller 121. In 401, the new software image for the controller is accepted. 403 includes updating the standby controller 123 with the accepted software image. Once the standby controller 123 is upgraded, it is re-started. So far no downtime is involved. Process block 405 includes switching the root AP and mesh APs (and possibly other mesh points) of the mesh network to the updated standby controller 123. This also typically includes no downtime. Process block 407 includes updating the old active controller 121, including re-booting the old active controller 121. Now both controllers are updated. Process block 409 is optional, and includes switching the old standby controller 123 to become the active controller, and the old active controller 121 to become the new standby controller for the mesh network 100. Alternately, the controllers are switched again, so that controller 121 is once again the active controller, and controller 123 is the standby controller.

In one embodiment, switching the root AP and mesh APs (and other mesh points) of the mesh network to the updated standby controller 123 includes instructing each AP (or other mesh point) one at a time to change over to be controlled by the standby controller 123 until all the mesh APs are controlled by the controller 123.

Note that many variations are possible. In general, the method includes updating one of the controllers with accepted software while the other controller controls the root access point and mesh access points, and switching the root access points and the mesh access points of the mesh network to the updated standby controller without interrupting operation of the mesh network, then updating the non-updated controller with the accepted software.

The method 400 thus provides the controller with an updated software image with relatively little disruption.

Upgrading Mesh APs by Pushing Out an Upgrade

One embodiment of the invention includes the mesh controller 121 pushing out an upgrade, e.g., a software upgrade or a configuration upgrade to the mesh APs of the mesh network, including the root access point.

Figure 5:
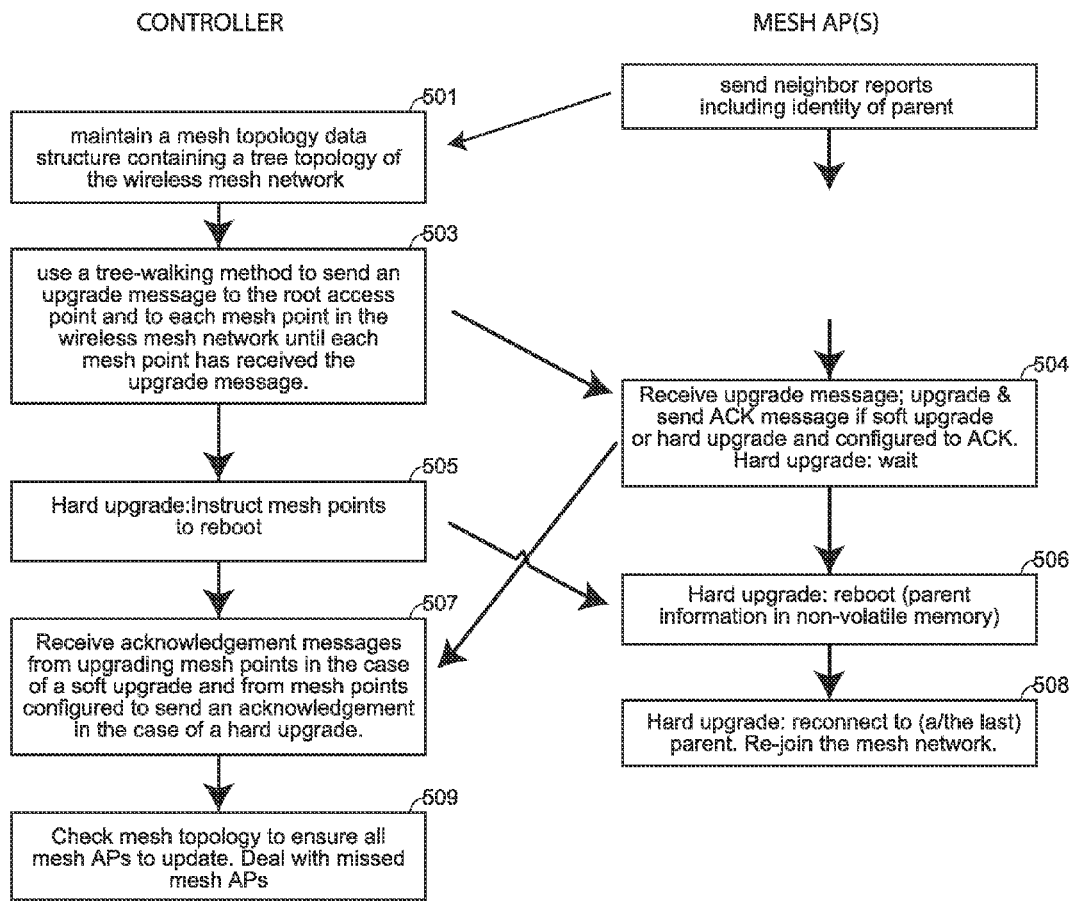
FIG. 5 shows one embodiment of a method of upgrading mesh points.

FIG. 5 shows one embodiment of a method 500 of upgrading mesh APs that includes a part that is implemented in the controller, and a part that is implemented in one or more access APs, including the root AP and other mesh APs. The method includes the mesh APs sending to the controller neighbor reports including information on the parent of each mesh AP sufficient for the controller to maintain a data structure on the tree topology of the mesh network. In 501, as a result of receiving the neighbor reports, the controller 121 maintains a mesh topology data structure, shown as data structure 313 in the memory 309 of the controller 121 in FIG. 3. The mesh topology data structure contains a tree topology of the wireless mesh network 100.

In one embodiment, the tree topology is formed by the mesh APs discovering each other adaptively by potential parents broadcasting messages, and other mesh APs choosing to join a parent mesh AP as a child mesh AP to the parent based on radio parameters of received broadcasts. One embodiment uses such a mesh tree topology forming a method called Adaptive Wireless Path Protocol (AWPP) by Cisco Systems, Inc. See for example, the article "How AWPP will make mesh networks easier to deploy," Parts 1 and 2, by Neal Castagnoli, in Wireless Net Design Line, Dec. 5, 2005, CMP Media LLC, 600 Community Drive, Manhasset, N.Y. 11030, downloadable (Sep. 28, 2006) as www~dot~wirelessnetdesignline~dot~com/howto/ 174900638 and www~dot~wirelessnetdesignline~dot~com/ howto/174900407 at www~dot~wirelessnetdesignline~dot~com where ~dot~ denotes the period "." in the actual URL.

In one embodiment, the neighbor reports are sent to the controller as LWAPP neighbor reports that are sent by each mesh AP once the mesh AP joins the mesh network 100 by selecting a parent mesh AP, or when a mesh AP changes its parent.

The method 500 further includes in 503 using a tree-walking method, also called a tree-traversal method that uses the maintained mesh topology data structure 313 to traverse the tree topology including each mesh node up to the leaf nodes of the tree topology. The tree-walking method is used to send an upgrade message to the root access point and to each mesh AP in the wireless mesh network until each mesh AP has received the upgrade message.

Many tree-walking methods are known, and would be known to those in the art, so such methods will not be described further herein other than stating that one tree-walking method use breadth first traversal, another uses depth first traversal.

A mesh AP receiving the upgrade message is able to upgrade according to the contents of the upgrade message without necessarily disrupting the mesh network. 504 shows a mesh AP receiving the upgrade message, selecting to carry out the upgrade (if there is an option), carrying out the upgrade, e.g., downloading the software, and in the case of a soft upgrade, or in the case of a hard upgrade and the mesh AP being configured to send an acknowledgement, sending an acknowledgement message to the controller.

In the case of a hard upgrade, the mesh AP in 504 waits for all mesh APs to receive the upgrade, and then for instructions from the controller to actually upgrade.

In the case of a hard upgrade, in 503, the controller 121 waits until all mesh APs have received an upgrade, e.g., until the tree-walk is complete.

In 505, in the case of a hard upgrade, the controller 121 sends a message to all mesh APs to reboot, for the upgrade to take effect.

In 507, the controller receives acknowledgement messages from the upgrading mesh APs in the case of a soft upgrade, and from mesh APs that are configured to send an acknowledgement in the case of a hard upgrade.

One embodiment of the invention includes using the following LWAPP message types, and includes extending LWAPP to include these frame types. These LWAPP messages are called "LWAPP upgrade protocol messages." The three frames are:

1) An "LWAPP software upgrade message." Such an LWAPP upgrade protocol message is sent by the mesh controller to the mesh APs or other controlled mesh APs using the tree walk in 503 of the method 500 of FIG. 5 to cause a software upgrade. Like many other LWAPP messages, an LWAPP configuration upgrade message is payload-based. The message payload includes the new software image, and in one embodiment, one ore more upgrade parameters, e.g., image version, image size, and so forth.
2) An "LWAPP configuration upgrade message." Such a message is sent by the mesh controller to the mesh APs or other controlled mesh APs to cause a configuration upgrade. Like many other LWAPP messages, an LWAPP configuration upgrade message is payload-based. The message may include different payloads, channel information, data rate information, power setting information, and so forth.
3) "LWAPP upgrade ACK message." Such an ACK message is sent by a mesh AP or other controlled mesh APs to the mesh controller 121 to acknowledge that an upgrade has taken effect. In one version, an LWAPP upgrade ACK message optionally includes the location of the mesh AP so that the mesh controller can further tune its tree-walk method based on which mesh AP has completed the upgrade.

In the case of a soft upgrade, not all mesh APs may choose to upgrade, so that all soft upgrades are acknowledged by sending an LWAPP upgrade ACK message in 504. In one embodiment, the not upgrading by a mesh AP is an option configurable from the controller.

In the case of a hard upgrade, one embodiment of the mesh AP (or other mesh point) such as mesh AP 111 shown in FIG. 3 allows the mesh AP to be configured to send an LWAPP upgrade ACK message when upgraded. Not sending such an ACK message is acceptable because the controller 121 can reasonably expect that a mesh AP instructed to upgrade will so upgrade. Furthermore, in some cases, the upgrading mesh AP, when rebooting, may need to re-discover a parent. In such a case, the hard upgrade is acknowledged by the re-discovery of the mesh AP, and such a mesh AP sending the controller an LWAPP neighbor report. If the mesh AP was configured to acknowledge a hard upgrade, the mesh AP further sends in 504 the LWAPP upgrade ACK message to the controller.

Figure 6:
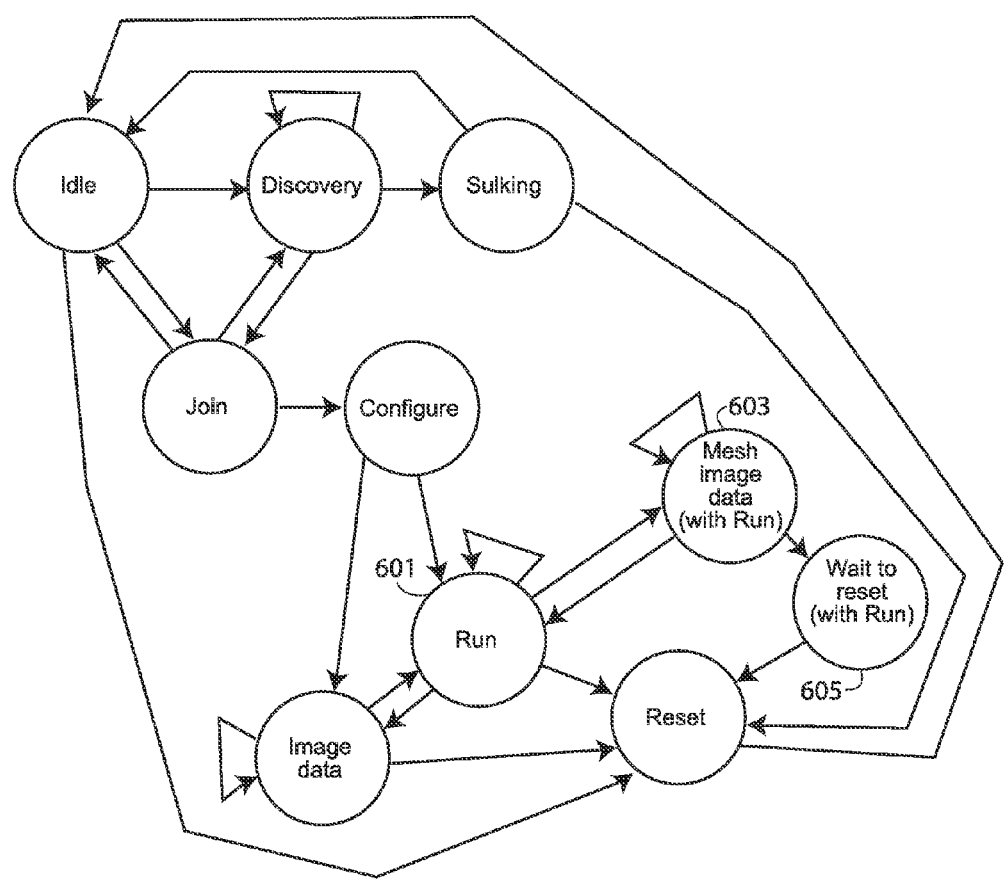
FIG. 6 shows the states and the state transitions of each such modified LWAPP state machine according to some embodiments of the present invention.

Each controller and each mesh AP (including the root AP 101) that conform to LWAPP run an LWAPP state machine, also called a CAPWAP state machine, also an LWAPP state machine herein. In one embodiment, a modified instance of a mesh AP LWAPP state machine is run as part of software 211 in the memory 209 of the mesh AP 111 shown in FIG. 2, and a modified instance of the controller LWAPP state machine is run as part of software 311 in the memory 309 of the controller 121 shown in FIG. 3. FIG. 6 shows the states and the state transitions of each such modified LWAPP state machine. One of the states is an LWAPP Run state 601 in which normal operation of the controller 121 controlling a mesh AP, in the case of a controller LWAPP state machine, and of the mesh AP, e.g., the mesh AP 111 operates in the case of a mesh AP LWAPP state machine. One embodiment of the mesh AP uses a mesh AP LWAPP state machine with two additional states, a LWAPP Mesh Image Data state 603 in which the mesh AP runs as in the Run state, but with additional image download functions run in the background, and a LWAPP Wait to Reset state 605 in which the mesh AP runs as in the Run state, while in a wait state waiting for an instruction to reset. Furthermore, one embodiment of the controller 121 uses a controller LWAPP state machine with one additional state, a LWAPP Mesh Image Data state 603 in which the controller runs as in the Run state, but with additional image download functions run in the background. Note that for the Controller, the LWAPP Wait for Reset state is not necessary, and further, there is a transition from the controller's LWAPP Mesh Image Data state 603 to the controller's LWAPP Run state 601.

Software Upgrade

One type of hard upgrade is a software upgrade. Typically, a software image, e.g., of the firmware in a mesh AP, is sent to the mesh AP by the controller, the mesh AP upgrades its software by loading the new firmware image, and then restarts, e.g., reboots.

In one embodiment, 503 includes the mesh controller sending all necessary upgrade information to all mesh APs by using the maintained tree-topology data structure 313, and a tree-walking method. In the case of a software upgrade, the controller uses a tree-walking method to traverse each mesh AP in the mesh network as maintained in the mesh topology data structure 313, systematically sending an LWAPP software upgrade message to each mesh AP, including the root AP to distribute new software image to all the mesh APs. The download continues until the controller known that all updating mesh APs have the new software.

At 505, the controller, knowing that all mesh APs have the updated software, issues the mesh APs an LWAPP reset message for the mesh APs to reset.

In an alternate embodiment, rather than the controller issuing all mesh APs an LWAPP reset message at the same time, the reset mechanism it layered so that different sets of mesh APs reboot at different times in a controlled manner. In one embodiment, the controller sends an LWAPP reset message to the root AP 101 to upgrade by rebooting to the upgraded software, then, after, for example, an acknowledgement is received from the root AP that it has reset, the controller 121 sends an LWAPP reset message to all the mesh APs that one hop from the root AP to upgrade by rebooting to the upgraded software, then, e.g., after an acknowledgement is received, the controller 121 sends an LWAPP reset message to all the mesh APs that two hops from the root AP to upgrade, and so forth.

In another alternate embodiment, the layering is from the outside in. In such an alternate embodiment, after all mesh APs have the upgraded software, the controller sends an LWAPP reset message to mesh APs that are furthest from the root AP 101 to upgrade by rebooting to the upgraded software, then, after, for example, an acknowledgement is received from these furthermost mesh APs, the next furthest mesh APs are rebooted by the controller 121 sending them an LWAPP reset message, and so forth, until the root AP 101 is upgraded by the controller sending the root AP an LWAPP upgrade message.

According to the CAPWAP draft specification, each mesh AP and the controller 121 LWAPP state machines have an LWAPP Image Data state during which the controller can download the controller's latest version of the software image for the mesh AP. For example, a mesh AP enters the LWAPP Image Data state when it successfully authenticates and joins the controller, determines that its software version number and the software version number advertised by the controller are different. In such a situation, the mesh AP transmits an LWAPP Image Data Request message requesting that a download of the controller's latest software be initiated, and the controller receives the LWAPP Image Data Request message from the mesh AP and transmits an LWAPP Image Data Response message to the mesh AP, which includes at least a portion of the software image.

According to the CAPWAP draft specification, there also is permitted a transition from the normal run state, called the LWAPP Run state, to the LWAPP Image Data state that occurs at the controller and includes the controller transmitting an LWAPP Image Data Request message to the mesh AP that contains an LWAPP Initiate Download message element to instruct the mesh AP to initiate a software upgrade.

One embodiment of the invention uses a similar method but with the controller in the LWAPP Mesh Image Data state 603. Thus, in one embodiment, the preparing for a software upgrade in 503 by using the maintained data structure 313 and carrying out the tree-walk includes the controller transitioning to its LWAPP Mesh Image Data state 603, then, while it is still controlling mesh APs, that is while in the run state, in the background sending an LWAPP software upgrade message that includes, e.g., is in the form of an LWAPP Image Data Request message containing an LWAPP Initiate Download message element to indicate to a receiving mesh AP that is should initiate its own upgrade by sending an LWAPP Image Data Request message to the controller 121. Each mesh AP receiving an LWAPP Image Data Request message with the LWAPP Initiate Download message element transitions to its LWAPP Mesh Image Data state that maintains the mesh AP in the run state, while in the background, the mesh AP responds to the controller by transmitting an LWAPP Image Data Request message to the controller 121, with an LWAPP Image Filename message element included that is used to initiate the firmware download process and contains the software image filename, which the controller subsequently transfers to the Mesh AP via an LWAPP Image Data Response message containing an LWAPP Image Data message element with at least part of the software. The Controller carries out this transfer in the background while in the LWAPP Mesh Image Data state 603. Therefore, no downtime occurs in the mesh AP or the controller during the transfer. The transfer itself may require several messages, so several transitions from the LWAPP Mesh Image Data state 603 back to the same LWAPP Mesh Image Data state 603.

In another embodiment, rather than the controller sending to each mesh AP a message to initiate its own software upgrade in the sending in 503 as part of the tree-walk, the controller sends a new LWAPP software upgrade message that is similar to an LWAPP Image Data Response message containing an LWAPP Image Data message element, and which includes at least a portion of the software image. This causes the mesh AP to transition to its LWAPP Mesh Image Data state 603 to receive the software, and then to transition to the LWAPP Mesh Wait for Reset state 605 to wait to reset.

The LWAPP Mesh Image Data state 603 is maintained at the controller and the mesh AP being upgraded during the software download phase. Each message received by the mesh AP includes information as to whether or not the controller has more data to send. This continues until all the software is received at the mesh AP. The downloading occurs in the background while the controller and mesh AP each continues normal operation, e.g., as in the respective LWAPP Run state 601.

When an image download completes, the mesh AP enters the LWAPP Mesh Reset state, and waits for a message from the controller to reset.

The Controller carries out 503 of the tree walk until each and every mesh AP (or other mesh point) has received the new software.

At this stage, in 505 the controller issues a LWAPP Reset message for each mesh AP to reboot which terminates the connection. In the reset stage, the mesh AP reboots. Returning to FIG. 5, the reboot is shown in 506.

One embodiment of the invention in the mesh AP includes the mesh AP rebooting while maintaining knowledge of its parent so that after reboot, the mesh AP can re-connect with the same parent so that it is likely that the LWAPP tunnel to the controller via the parent remains connected.

In one embodiment, each mesh AP includes a non-volatile memory 221 as part of memory 209. By non-volatile memory is meant memory whose contents survive the re-start, e.g., reboot that occurs after a new software image is loaded. The mesh AP when operating stores at least the identity of its last parent mesh node as parent information 223 in the non-volatile memory 221. In one embodiment, the mesh AP stores as parent information 223 its last few parents, and also stores potential parents from the mesh APs having received discovery broadcasts from potential parents, such that, that after-rebooting, the mesh AP need not undergo a complete tree discovery, but rather can re-connect with its previous parent. In such a manner, because the re-connection happens relatively fast, an LWAPP tunnel to the controller is maintained and the mesh AP need not undergo a new re-join of the mesh, including scanning/seeking for a new parent, a new re-authentication, and a re-establishing a secure tunnel to the controller. The inventor has found that in a real network, routing parents should not change across reboots.

Thus, in the embodiment shown in FIG. 5, in the case of a hard update, 506 includes parent information 223 stored in non-volatile memory 221 when the reboot occurs.

In 508 the mesh AP completes the reboots and reconnects to a parent, e.g., its last parent mesh AP to re-join the mesh network. In some embodiments, 508 might include a complete parent discovery sequence.

Configuration Upgrade

A typical soft upgrade is a configuration upgrade in which the controller causes a change in the configuration of the mesh APs.

One embodiment of a method of carrying out a configuration upgrade follows the flowchart shown in FIG. 5. Some configuration upgrades are hard upgrades, i.e., requiring a reboot, while others are soft upgrades.

Figure 7:
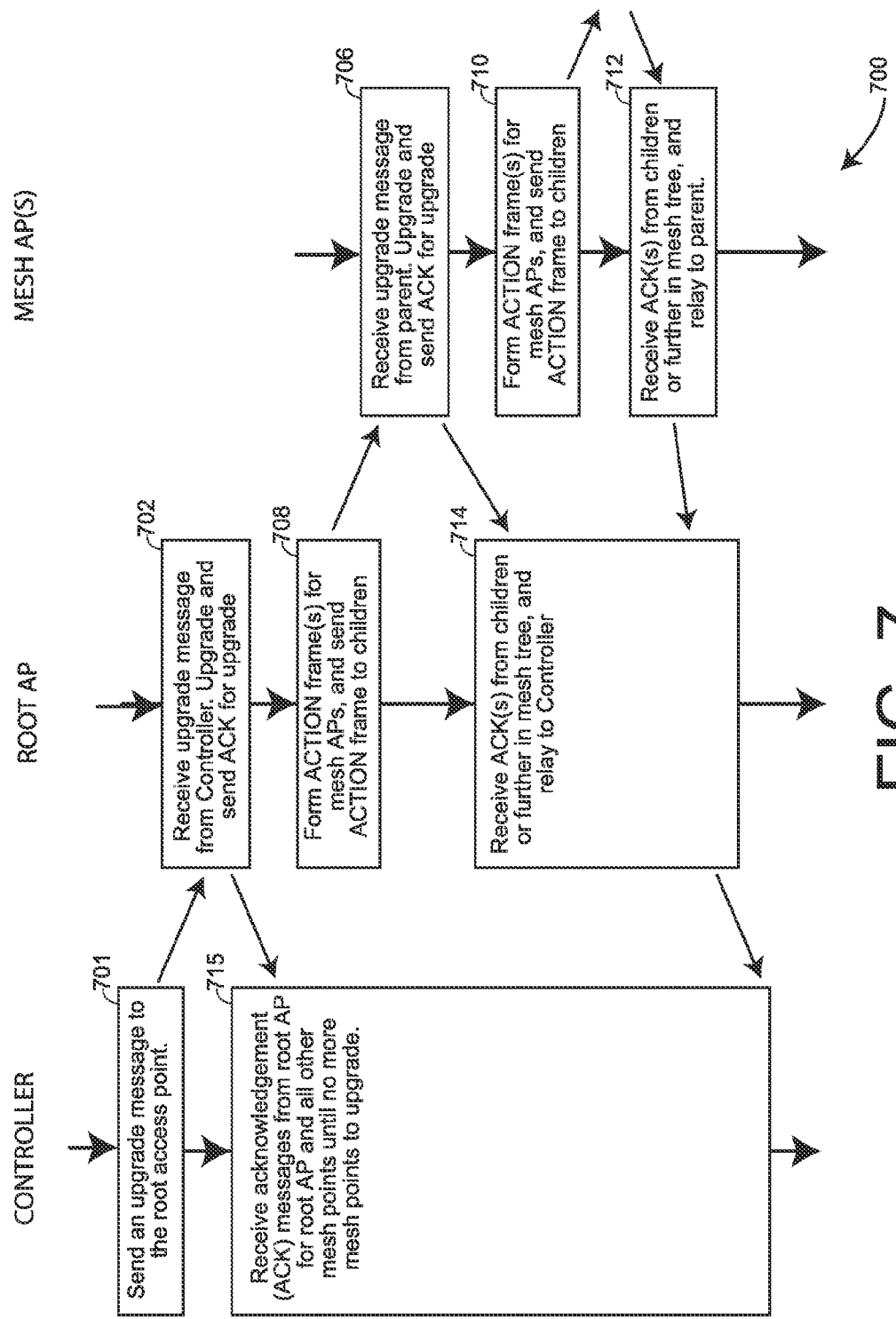
FIG. 7 shows one embodiment of a method of carrying out a configuration upgrade

Another embodiment includes using action frames according to the IEEE802.11h standard. FIG. 7 shows one embodiment of a method 700 of carrying out a configuration upgrade. Shown are processes that are carried out in the controller 121, in the root AP 101, and in one or more other mesh APs of the network. FIG. 7 assumes that the upgrade is a soft upgrade or a hard upgrade in which the root AP and the mesh APs are configured to send acknowledgement messages as a result of a pending upgrade.

For the case of such a configuration upgrade, the inventor noticed that present day centrally controlled mesh networks include the ability for a controller to send an LWAPP configuration response message that includes "dot11h" payload for a channel change for propagation in a mesh network via the root access point. Embodiments of the invention extend this to other configuration changes that are pushed out to all the mesh APs in the mesh network. In the case of a configuration upgrade message, in 701, the mesh controller 121 sends an LWAPP configuration upgrade message to the root AP 101. Once the root AP 101 receives this message in 702, it upgrades and sends the acknowledgement for the upgrade. In 708, the root AP 101 forms IEEE 802.11h ACTION-like frames with the LWAPP upgrade information, and sends the ACTION-like frames to its directly connected children to propagate the LWAPP upgrade information. The reader is assumed to be familiar with the IEEE 802.11h standard. References herein to the IEEE 802.11h standard refer to the 2003 version. See, for example, ISO/IEC 8802-11:2005/Amd 5:2006 (IEEE Std 802.11h-2003) (Amendment to ISO/IEC 8802-11:2005). In addition to traditional ACTION frames that handle channel change, one embodiment includes using one of a set of what are called ACTION-like frames for other configuration parameters. One new ACTION-like frame includes power setting information; another new ACTION frame includes data rate information. Yet another new ACTION frame includes range information, and so forth.

The Action frame is an IEEE 802.11 frame of type "management" and subtype "Action." The frame body includes an Action field, and the Action field includes a category field and an Action details field. Table 19a of the IEEE 802.11h standard defines some category values. For example, a channel change would be under the defined category of spectrum management, which is defined in the IEEE 802.11h as value 0. Power setting, range setting, and data rate setting are new categories, and some of the unused category values are used in one embodiment of the invention for the new Action frames. The Action details field of an Action frame is described in Section 7.4 of the IEEE 802.11h standard. The Action details field includes, for the category, a 1-byte Action field, and a variable length information element for the particular action. In this manner, new Action frames are definable for each type of configuration upgrade, e.g., for causing a channel switch in a radio interface, causing a power setting in a radio interface, causing a data rate setting in a radio interface, and causing a range setting. Alternate embodiments include fewer or more configuration capabilities.

In 706, each mesh AP receives the upgrade message in for the form of one or more IEEE 802.11h ACTION-like frames, upgrades as necessary, and sends an upgrade ACK for its upgrade to its immediate parent for relay to the controller. In 710 the receiving mesh AP propagates the LWAPP upgrade information to its child mesh APs until there is no directly connected child remaining to send to. In 712, each mesh AP receives ACKs from its children or relayed ACKs from further down the tree, and relays such ACKs to its parent.

In some embodiments, each mesh AP waits appropriately and/or sends multiple copies of the LWAPP upgrade information and/or receives LWAPP Upgrade ACK information to reliably ensure that all intended recipient mesh APs have received the LWAPP upgrade information. This method requires reliability for backhaul upgrade propagation messages so that a network upgrade is robust.

In 714 the root mesh AP receives ACKs from its children and from further down the tree. The root mesh AP relays all received ACKs to the controller in the form of an LWAPP upgrade ACK message.

In 715, the controller receives the LWAPP upgrade ACK messages sent by the root AP for the root mesh AP and all other mesh APs that sent an ACK.

The controller waits until there are no more mesh APs to upgrade, e.g., from which to receive ACKs.

Note that presented herein are embodiments of a "push" method initiated and driven by the mesh controller 121 that have the potential to reduce upgrade downtime of mesh nodes compared to known methods of carrying out an upgrade. Note that, in order to be fully compatible with an up-and-operational network, new mesh nodes joining the network will need to use existing LWAPP image upgrade methods such as when joining a controller, checking software version, and if not-up-to-date initiating a software image download.

The mesh topology may change dynamically while upgrade pre-processing is in progress. One embodiment includes the tree-walking method of 503 flagging each completed mesh AP in the tree topology data structure 313. Such a method also is designed to be robust so that when topology changes are learnt via LWAPP mesh neighbor reports, the upgrade processing of 503 is not affected.

Thus in one embodiment, each entry in the tree-topology data structure 313 includes a flag to indicate when a mesh node has (likely) been upgraded.

Returning to FIG. 5, in one embodiment, the original tree structure is completed in 503, with acknowledgements received, as appropriate, in 505. In 509, the controller checks the possibly updated mesh topology to ensure all mesh APs have been flagged. If not, the controller sends the appropriate LWAPP upgrade message(s) to the missed mesh nodes.

In an alternate embodiment, 503 (and 505) includes checking on-the-fly whether or not the tree topology changes as indicated by receipt of LWAPP mesh neighbor reports received at the controller 121, and the checking that each node in any new topology is covered by the walk, if not, upgrading specific nodes is carried out on the fly so that an the end of 505, the current topology has been upgraded.

Note that FIG. 7 does not show the tree-walking part, that in this case, marks off ACKs as they are received at the controller so that the controller 121 knows when all mesh APs have been upgraded. Those in the art will understand that such marking off ACKs is readily added to the method shown in FIG. 7.

It should be appreciated that although the invention has been described in the context of the IEEE 802.11 standard, the invention is not limited to such contexts and may be utilized in various other applications and systems.

Furthermore, it is to be understood that while the invention has in general been explained in terms of mesh APs, the invention is applicable to mesh points that do not have the AP functionality, and, for example, act as relay mesh points. Furthermore, although FIG. 2 shows a mesh AP that includes two physical radio interfaces, one for the backhaul network, and another for the access network, e.g., the basis service set infrastructure network formed by the AP functionality of the mesh AP, the invention is applicable also to mesh APs that have a single physical radio interface; some APs may function with only a single radio for both the backhaul network and access network.

In keeping with common industry terminology, the terms "base station," "access point," and "AP" may be used interchangeably herein to describe an electronic device that may communicate wirelessly and substantially simultaneously with multiple other electronic devices, while the terms "client," "mobile device" and "STA" may be used interchangeably to describe any of those multiple other electronic devices, which may have the capability to be moved and still communicate, though movement is not a requirement. However, the scope of the invention is not limited to devices that are labeled with those terms.

While an embodiment has been described with a backhaul network for operation in an OFDM receiver with RF frequencies in the 5 GHz range and an access radio interface in the 2.4 GHz range (the 802.11a and 802.11g variants of the IEEE 802.11 standard), the invention may be embodied in receivers and transceivers operating in other RF frequency ranges. Furthermore, while a device for operation conforming to the IEEE 802.11 standard has been described, the invention may be embodied in devices conforming to other standards and for other applications, including, for example other WLAN standards and other wireless standards. Applications that can be accommodated include wireless Ethernet, HIPERLAN 2, European Technical Standards Institute (ETSI) broadband radio access network (BRAN), and multimedia mobile access communication (MMAC) systems, wireless local area networks, local multipoint distribution service (LMDS) IF strips, wireless digital video, wireless USB links, wireless IEEE 1394 links, TDMA packet radios, low-cost point-to-point links, voice-over-IP portable "cell phones" (wireless Internet telephones), etc.

In the context of this document, the term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not.

Unless specifically stated otherwise, as apparent from the following discussions, it is appreciated that throughout the specification discussions utilizing terms such as "processing," "computing," "calculating," "determining" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The term memory unit as used herein, if clear from the context and unless explicitly stated otherwise, also encompasses a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one of more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code.

Furthermore, a computer-readable carrier medium may form, or be included in a computer program product.

In alternative embodiments, the one or more processors operate as a standalone device or may be connected, e.g., networked to other processor(s), in a networked deployment, the one or more processors may operate in the capacity of a server or a client machine in server-client network environment, or as a peer machine in a peer-to-peer or distributed network environment. The one or more processors may form a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine.

Note that while some diagram(s) only show(s) a single processor and a single memory that carries the computer-readable code, those in the art will understand that many of the components described above are included, but not explicitly shown or described in order not to obscure the inventive aspect. For example, while only a single machine is illustrated, the term "machine" shall also be taken to include any collection of machines that individually or jointly execute a set (or multiple sets) of instructions to perform any one or more of the methodologies discussed herein.

Thus, one embodiment of each of the methods described herein is in the form of a computer-readable carrier medium carrying a set of instructions, e.g., a computer program that are for execution on one or more processors, e.g., one or more processors that are part of a mesh AP or that are part of a controller. Thus, as will be appreciated by those skilled in the art, embodiments of the present invention may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code embodied in the medium.

The software may further be transmitted or received over a network via a network interface device. While the carrier medium is shown in an example embodiment to be a single medium, the term "carrier medium" should be taken to include a single medium or multiple media (e.g., a centralized or distributed database, and/or associated caches and servers) that store the one or more sets of instructions. The term "carrier medium" shall also be taken to include any computer-readable storage medium that is capable of storing, encoding or carrying a set of instructions for execution by one or more of the processors and that cause the one or more processors to perform any one or more of the methodologies of the present invention. A carrier medium may take many forms, including but not limited to, non-volatile media, and volatile media. Non-volatile media includes, for example, optical, magnetic disks, and magneto-optical disks. Volatile media includes dynamic memory, such as main memory. For example, the term "carrier medium" shall accordingly be taken to included, but not be limited to, solid-state memories, a computer product embodied in optical and magnetic media, a medium bearing a propagated signal detectable by at least one processor of one or more processors and representing a set of instructions that when executed implement a method.

[It will be understood that the steps of methods discussed are performed in one embodiment by an appropriate processor (or processors) of a processing (i.e., computer) system executing instructions (computer-readable code) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

All publications, patents, and patent applications cited herein are hereby incorporated by reference.

Any discussion of prior art in this specification should in no way be considered an admission that such prior art is widely known, is publicly known, or forms part of the general knowledge in the field.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

I claim:

1. A method comprising:
    maintaining a mesh topology data structure containing information on a tree topology of a wireless mesh network comprising mesh points, including a root access point and one or more other mesh points including at least one mesh access point, the root access point forming a root of the tree topology; and
    using a tree-walking method to send an upgrade message to the root access point and to each other mesh point in the wireless mesh network until each mesh point has received the upgrade message,
    wherein receiving the upgrade message enables the receiving mesh point to upgrade according to contents of the upgrade message without necessarily disrupting the wireless mesh network,
    wherein in case the upgrade message is for an upgrade wherein none of the receiving mesh points needs to be rebooted, the method further comprises receiving an upgrade acknowledgement message from one or more mesh points that receive the upgrade message and that upgrade as a result of the receipt, and
    wherein in case the upgrade message is for an upgrade wherein the receiving mesh points need to be rebooted, said using the tree-walking method to send the upgrade continues until it is known that all mesh points of the tree topology have received the upgrade message, the method further comprises sending a message to all the mesh points of the wireless mesh network to reboot once it is known that all mesh points of the tree-topology have received the upgrade message,
    wherein the upgrade message for a particular mesh point includes one or both a software upgrade message comprising new operating software for the particular mesh point, and a configuration upgrade message comprising one or more new wireless mesh network configuration parameters for the mesh point.

2. A method as recited in claim 1, wherein the upgrade message is for an upgrade wherein none of the receiving mesh points need to be rebooted, the method further comprising receiving an upgrade acknowledgement message from each mesh point that receives the upgrade message and upgrades as a result of the receipt.

3. A method as recited in claim 1, wherein the upgrade message is for an upgrade wherein the receiving mesh points need to be rebooted, and wherein the using the tree-walking method to send the upgrade continues until all mesh points of the tree topology receive the upgrade message, the method comprising sending a message to the mesh points to reboot once all mesh points of the tree-topology have received the upgrade message.

4. A method as recited in claim 3, wherein the upgrade message includes a software upgrade message comprising new software for the mesh point, and wherein the sending of the upgrade message to a particular mesh point comprises downloading new software to the particular mesh point.

5. A method as recited in claim 1, wherein the upgrade message includes a configuration upgrade message comprising one or more new configuration parameters for the mesh point.

6. A method as recited in claim 5, wherein the configuration parameters comprise channel change information.

7. A method as recited in claim 5, wherein the configuration parameters comprise one or more of power setting information and/or data rate information.

8. A method as recited in claim 1, wherein the root access point and mesh access points are lightweight access points controlled by messaging to and/or from a controlled mesh point using a lightweight access point protocol, and wherein the upgrade message is a message in the lightweight access point protocol.

9. A method comprising:
    sending an upgrade message to upgrade mesh points of a wireless mesh network, the wireless mesh network comprising a tree topology, including a root access point and one or more other mesh points including at least one mesh access point, the sending comprising using a tree-walking method to send an upgrade message to the root access point and to each mesh point in the wireless mesh network until each mesh point has received the upgrade message,
    wherein the upgrade message to a mesh point is not a software upgrade that required rebooting the mesh point, the upgrade message including a configuration upgrade message comprising one or more wireless network configuration parameters for the mesh point including one or more of channel change information, power setting information, and/or data rate information, and
    wherein the root access point is operative to send one or more action messages to each intended mesh point comprising corresponding new configuration parameter or parameters, the sending of the action messages as a result of the root access point receiving the configuration upgrade message,
    and wherein receiving the action message or messages enables the receiving mesh point to upgrade its configuration according to contents of the configuration upgrade message without necessarily disrupting the wireless mesh network, and without using any additional inactive mesh point that can become active while receiving mesh point upgrades,
    wherein the upgrade message to a mesh point is a software upgrade that required rebooting the mesh point, said using the tree-walking method to send the upgrade continues until it is known that all mesh points of the tree topology have received the upgrade message, the method further comprises sending a message to all the mesh points of the wireless mesh network to reboot once it is known that all mesh points of the tree-topology have received the upgrade message,
    wherein the upgrade message for a particular mesh point includes one or both a software upgrade message comprising new operating software for the particular mesh point, and a configuration upgrade message comprising one or more new wireless mesh network configuration parameters for the mesh point.

10. A method as recited in claim 9, wherein the configuration parameters comprise channel change information.

11. A method as recited in claim 9, wherein the configuration parameters comprise one or more of power setting information and/or data rate information.

12. A method as recited in claim 9, wherein the ACTION messages comprise IEEE 802.11h ACTION frames.

13. A non-transitory computer-readable storage medium on which is encoded a set of instructions that when executed by at least one processor of a processing system cause the processing system to:
    maintain a mesh topology data structure containing information on a tree topology of a wireless mesh network comprising mesh points, including a root access point and one or more other mesh points including at least one mesh access point, the root access point forming a root of the tree topology; and
    use a tree-walking method to send an upgrade message to the root access point and to each other mesh point in the wireless mesh network until each mesh point has received the upgrade message,
    wherein receiving the upgrade message enables the receiving mesh point to upgrade according to contents of the upgrade message without necessarily disrupting the wireless mesh network,
    wherein in case the upgrade message is for an upgrade wherein none of the receiving mesh points needs to be rebooted, the method further comprises receiving an upgrade acknowledgement message from one or more mesh points that receive the upgrade message and that upgrade as a result of the receipt, and
    wherein in case the upgrade message is for an upgrade wherein the receiving mesh points need to be rebooted, said using the tree-walking method to send the upgrade continues until it is known that all mesh points of the tree topology have received the upgrade message, the method further comprises sending a message to all the mesh points of the wireless mesh network to reboot once it is known that all mesh points of the tree-topology have received the upgrade message,
    wherein the upgrade message for a particular mesh point includes one or both a software upgrade message comprising new operating software for the particular mesh point, and a configuration upgrade message comprising one or more new wireless mesh network configuration parameters for the mesh point.

14. A system comprising:
    a controller;
    a root access point coupled to the controller; and
    one or more other mesh points, including at least one mesh access point wirelessly coupled via a wireless mesh network to the root access point, the root access point and other mesh points forming a tree topology of mesh points in which the root access point is a root of the tree topology, the controller being operative to control operation of the wireless mesh network,
    wherein the controller is further operative to maintain a mesh topology data structure containing information on the tree topology, and wherein the controller is further operative to initiate an upgrade of the mesh points, comprising using a tree-walking method to send an upgrade message to the root access point and to each mesh point in the wireless mesh network until each mesh point has received the upgrade message, and
    wherein receiving the upgrade message enables the receiving mesh point to upgrade according to contents of the upgrade message without necessarily disrupting the wireless mesh network,
    wherein in case the upgrade message is for an upgrade wherein none of the receiving mesh points needs to be rebooted, the method further comprises receiving an upgrade acknowledgement message from one or more mesh points that receive the upgrade message and that upgrade as a result of the receipt,
    wherein in case the upgrade message is for an upgrade wherein the receiving mesh points need to be rebooted, said using the tree-walking method to send the upgrade continues until it is known that all mesh points of the tree topology have received the upgrade message, the method further comprises sending a message to all the mesh points of the wireless mesh network to reboot once it is known that all mesh points of the tree-topology have received the upgrade message,
    wherein the upgrade message for a particular mesh point includes one or both a software upgrade message comprising new operating software for the particular mesh point, and a configuration upgrade message comprising one or more new wireless mesh network configuration parameters for the mesh point.

15. A system as recited in claim 14, wherein the upgrade message is for an upgrade wherein the receiving mesh points need to be rebooted, and wherein the using of the tree-walking method to send the upgrade continues until all mesh points of the tree topology receive the upgrade message, the method comprising sending a message to the mesh points to reboot once all mesh points of the tree-topology have received the upgrade message.

16. A system as recited in claim 15, wherein the upgrade message includes a software upgrade message comprising new software for the mesh point, and wherein each mesh point is operative to wait for a message to reboot after receiving the new software, and further to reboot in response to receiving the message to reboot.

17. A system as recited in claim 14, wherein the upgrade message includes a configuration upgrade message comprising one or more new configuration parameters for the mesh point.

18. A system comprising:
    a controller;
    a root access point coupled to the controller; and
    one or more other mesh points, including at least one mesh access point wirelessly coupled via a wireless mesh network to the root access point, the root access point and other mesh points forming a tree topology of mesh points in which the root access point is a root of the tree topology, the controller being operative to control operation of the wireless mesh network,
    wherein the controller is further operative to send an upgrade message using a tree-walking method to send the upgrade message to the root access point and to each mesh point in the wireless mesh network until each mesh point has received the upgrade message,
    wherein in case the upgrade message comprising one or more wireless network configuration parameters for the mesh points of the wireless mesh network wherein none of the receiving mesh points needs to be rebooted,
    the root access point is operative to respond to receiving the upgrade message, including upgrading according to the wireless network configuration parameters, sending an acknowledgement message to the controller, sending one or more action messages containing the one or more wireless network configuration parameters to each of its directly connected mesh points, waiting for acknowledgements from other mesh points of the wireless mesh network, and sending an acknowledgement message to the controller corresponding to the received acknowledgements, wherein each other mesh point is operative to respond to receiving the action messages, including:

upgrading according to the configuration parameters, sending an acknowledgement to its immediate parent in the tree topology, and in case that there are directly connected child mesh points, sending the one or more action messages to each of its directly connected child mesh points, waiting for acknowledgements from its child mesh points of the wireless mesh network, and sending an acknowledgement to its parent corresponding to the received acknowledgements, and wherein the upgrading according to the wireless network configuration parameters occurs without necessarily disrupting the mesh network, and without using any additional inactive mesh point that can become active while receiving mesh point upgrades, wherein in case the upgrade message comprising software upgrade message for the mesh points of the wireless mesh network wherein the receiving mesh points need to be rebooted, said using the tree-walking method to send the software upgrade message continues until it is known that all mesh points of the tree topology have received the software upgrade message, the method further comprises sending a message to all the mesh points of the wireless mesh network to reboot once it is known that all mesh points of the tree-topology have received the upgrade message, wherein the upgrade message for a particular mesh point includes one or both a software upgrade message comprising new operating software for the particular mesh point, and a configuration upgrade message comprising one or more new wireless mesh network configuration parameters for the mesh point.

* * * * *